United States Patent
Echensperger et al.

(10) Patent No.: US 6,199,160 B1
(45) Date of Patent: Mar. 6, 2001

(54) COMPUTER SYSTEM AND METHOD FOR PERFORMING MULTIPLE TASKS

(75) Inventors: Heimo Echensperger, Waldenbuch; Wolfgang Eibach, Holzgerlingen; Michael Fox, Horb; Hans H. Harz, Boeblingen; Rolf Schaefer, Waldenbuch; Ralf Streit, Heimsheim, all of (DE)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/223,891

(22) Filed: Apr. 6, 1994

(30) Foreign Application Priority Data

Sep. 14, 1993 (DE) .............................................. 93 114 714

(51) Int. Cl.⁷ ..................................................... G06F 9/46
(52) U.S. Cl. .................................................. 713/100; 710/9
(58) Field of Search ..................................... 395/670, 680, 395/677, 527; 713/100; 364/232.1, 234, 228.2, 229; 710/9

(56) References Cited

U.S. PATENT DOCUMENTS

| | | | |
|---|---|---|---|
| 4,914,607 | * | 4/1990 | Takanashi et al. ..................... 364/521 |
| 5,029,077 | * | 7/1991 | Fatahalian et al. ................... 364/200 |
| 5,060,149 | * | 10/1991 | Flurry et al. ......................... 364/200 |
| 5,165,020 | * | 11/1992 | Sudama et al. ....................... 395/200 |
| 5,233,611 | * | 8/1993 | Triantafyllos ....................... 371/16.1 |
| 5,265,251 | * | 11/1993 | Agarawal et al. .................... 395/650 |
| 5,283,888 | * | 2/1994 | Dao et al. ............................ 395/500 |
| 5,337,412 | * | 8/1994 | Baker et al. ......................... 395/275 |
| 5,361,388 | * | 11/1994 | Kutsuna .............................. 395/275 |
| 5,600,789 | * | 2/1997 | Parker et al. .................... 395/183.14 |

FOREIGN PATENT DOCUMENTS

| | | |
|---|---|---|
| 0229336 | 7/1987 | (EP) . |
| 0362709 | 11/1990 | (EP) . |
| 62-10854 | 11/1987 | (JP) . |
| 3102551 | 4/1991 | (JP) . |

* cited by examiner

*Primary Examiner*—Majid A. Banankhah
(74) *Attorney, Agent, or Firm*—Schmeiser, Olsen & Watts; Lawrence R. Fraley

(57) ABSTRACT

The invention relates to a computer system and method for performing multiple tasks. The computer system comprises a host (2), a communication subsystem (3), a plurality of application programs (1, 2), virtual terminal manager (5), virtual terminals (9, 4), an application programming interface (6), and a cross application program (7) as well as a real terminal T. The logical connections $L_1$, $L_2$ of the application programs to their associated virtual terminals are independent from the logical connections of the respective virtual terminals to the real terminal T. The logical connections $l_{3T}$, $l_{2T}$ are user selectable by positioning of the software controllable switch 11. A plurality of application programs, for example applications programs ($A_1$, $A_2$), are integrated by the cross application program (7) which has access to the respective virtual terminals (4, 9) via the application programming interface (6) and the virtual terminal manager (5). The cross application program (7) can also be used for user simulation in order to automate the operation of the integrated application programs.

29 Claims, 7 Drawing Sheets

COMPUTER SYSTEM AND METHOD FOR PERFORMING MULTIPLE TASKS

FIELD OF THE INVENTION

Figure 1:
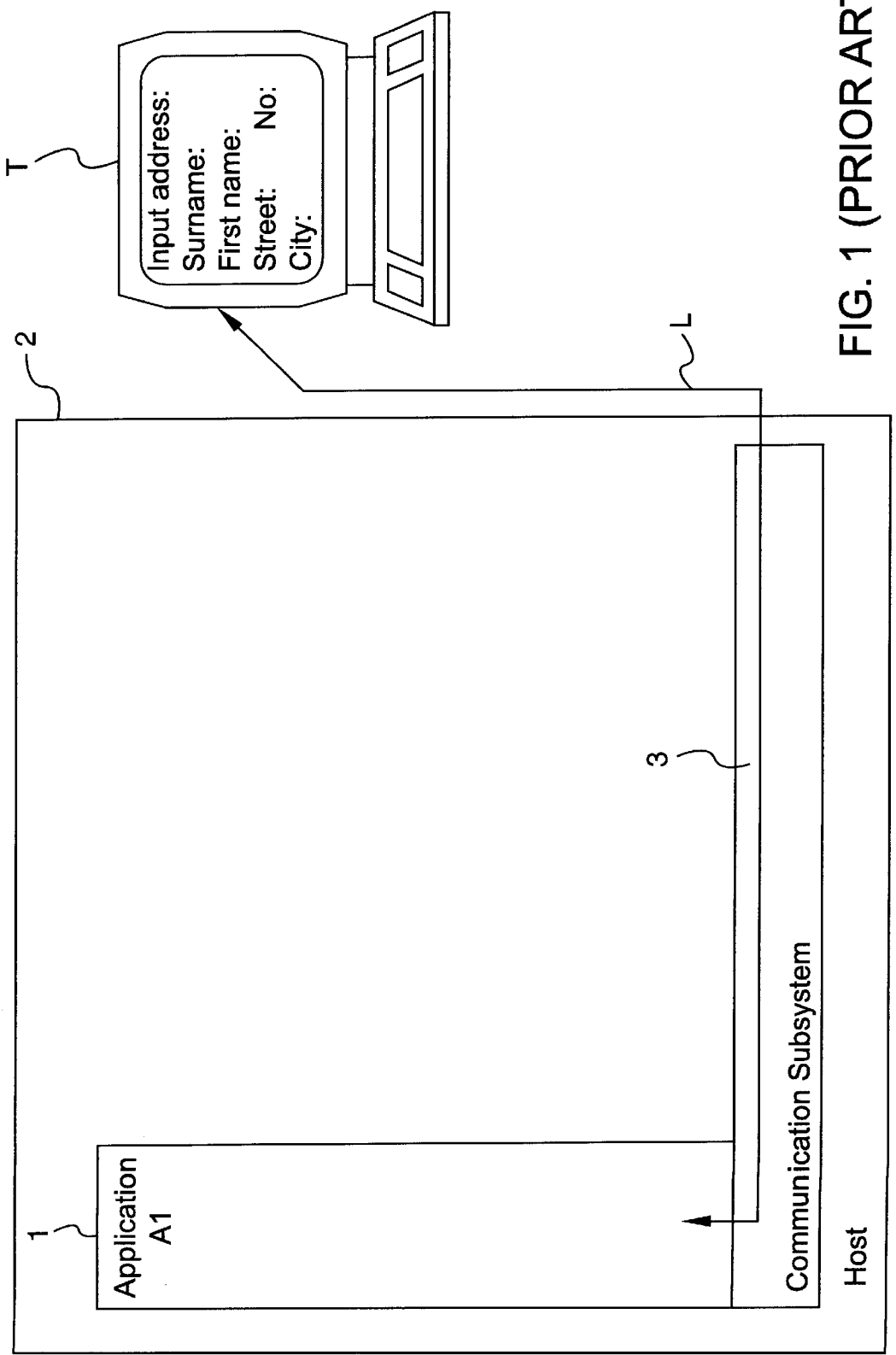

The invention relates to a computer system for performing multiple tasks comprising at least one terminal, at least one application program and a communication subsystem. Further the invention relates to a method for performing multiple tasks in a computer system.

BACKGROUND OF THE INVENTION

The prior art discloses a variety of inter-program communication methods in data processing networks comprising a host system connected to a plurality of terminals: The IBM System Journal, Vol. 22, No. 4, 1983 discloses a computer network with a communication subsystem which is the IBM system network architecture (SNA). On page 345 of that publication a network is defined as "a configuration of terminals, controllers, and processors and the links that connect them". When such a configuration supports user applications involving data processing and information exchange and conforms to the specifications of the system network architecture it is called an SNA network. Essentially SNA defines logical entities that are related to the physical entities in a network and specifies the rules for interactions among these logical entities. The logical entities of an SNA network include network addressable units and the path control network that connects them. Network addressable units communicate with one another using logical connections called "sessions". The three types of network addressable units (NAUs) are the logical unit (LU), the physical unit (PU), and the system services control point (SSCP) which are defined as follows:

Logical unit (LU). An LU is a port through which end users may access the SNA network. An end user uses an LU to communicate with another end user and to request services of a system services control point (SSCP).

Physical unit (PU). A PU is a component that manages the resources of a node in corporation with an SSCP.

System services control point (SSCP). This is a focal point for configuration management, problem determination and directory services for end users. SSCPs may have sessions with LUs and PUs. When such a session occurs, the LU or PU is in the domain of the SSCP. In addition to sessions with LUs and PUs, SSCPs may also communicate with each other to coordinate the initiation and the termination of sessions between logical units and in different domains.

From the hardware standpoint a simple network comprises a host system having a processing unit and a plurality of remote terminals that are assigned to individual users. The remote terminals are selectively connectable to the host system through one or more communication links. These links may comprise a coaxial cable, a dedicated telephone line or, in some cases, a satellite communication link.

The host processing unit must always have an operating system which supports the creation of a large number of virtual machines each of which is assigned, on request, to an end user. A virtual machine processes tasks for the assigned end user by time sharing the host processor hardware of the host system. Some host systems may include more than one hardware processor so that true simultaneous processing occurs at the host since a plurality of processors are running in parallel. More often, there is merely one hardware processor that "concurrently" runs data processing tasks for the virtual machines by a time sharing technique. This is transparent to the end users at the terminals.

Two general types of terminals are employed in data processing networks. The first is referred to as a "dumb terminal" in that it comprises merely a keyboard and a display device and little or no processing capability other than that required to make a connection with the host system. The second type of terminal is referred to as an intelligent work station (IWS) and is provided with its own processor unit and supporting peripheral devices. The terms IWS and personal computer (PC) are often used interchangeably. With the ready availability of PCs having very attractive price performance characteristics, most new networks are implemented with IWS-type terminals and many of the older networks are being modified with the replacement of dumb terminals with IWS-type terminals.

Providing each end user on the network with its own processing capability relieves the host CPU from doing many of the data processing tasks that were previously done at the host. The nature of the tasks that are processed by the host CPU therefore has changed and more sophisticated applications such as electronic mail and electronic calendaring are now implemented on the network under the control of the host system. Both of these applications involve what is referred to, as distributed application programs, in that one part of the application program is resident on the host system and another is resident on the IWS terminal.

Many of the current data processing networks are designed in accordance with the IBM SNA architecture which was first described in 1974. Since then various new functions and services have been added. As suggested earlier, SNA networks can be viewed as a plurality of nodes interconnected by data links. At each of these nodes, path control elements send information packets, referred to as path information units (PIUs) between resource managers called logical units. These logical connections of the paths are called a session. A transport network for data is therefore defined by the path control elements and the data link control elements.

Nodes can be connected by a plurality of links and comprise a plurality of LUs. Various types of LUs sessions and protocols have been established within the framework of the SNA architecture. There are three general classes of sessions. The first class is unspecified by SNA. The second class involves terminals and the third involves program to program communication. For example, LU 6 provides SNA defined inter-program communication protocols which avoids the limitations of terminal LU types such as LU 2 and LU 7. LU 6.2 is referred to as advanced program to program communication or APPC protocols.

Logical units are more than message ports. LUs provide operating system services such as program to program communication involving one or more local programs. Each application program use the LUs as a local operating system and the network of loosely coupled LUs connected by sessions as a distributed operating system.

The LU allocates a plurality of resources to its programs, which are dependent on the particular hardware and its configuration. Some of the resources that are made available are remote while others are local, i.e., associated with the same LU as the application program. The sessions are considered local resources at each LU, but are shared between particular LUs.

The control function of an LU is resource allocation. Programs request access to a resource. Sessions which carry messages between LUs or programs running on LUs are considered to share resources. A session is divided into a plurality of serially executed conversations.

Two LUs connected by a session have a shared responsibility in allocating sessions to application programs for use as "conversations". The application programs are therefore sometimes referred to "transaction programs".

The successful connection between LUs occurs as a result of a common set of protocols which function first to activate a session between two LUs and second to facilitate the exchange of message data. A request to activate a session between two logical units is also called "BIND".

The SNA format and protocol reference manual designated SC 30-3112, published by the IBM Corporation, describes SNA by defining, for example, with programming language declarations, the format of messages that flow between network entities and the programs that generate, manipulate, translate, send and return messages.

The SNA transaction program reference manual for LU 6.2 referred to as GC 30-3084, published by the IBM Corporation, defines the verbs that describe the functions provided by the implementing products.

Even though SNA type communication subsystems are widely used other communication subsystems such as the transmission control protocol/internet protocol (TCP/IP) which is an UNIXtype/ethernet-based system-interconnect protocol are known from the prior art.

FIG. 1 shows a prior art example of a computer system in which an application program is logically connected via a communication subsystem to a terminal T. The computer system comprises at least a host 2 and a communication subsystem 3. The applications program $A_1$ is stored in storage space 1 of the host 2. The communication subsystem which is, for example, of an SNA or TCP/IP type, serves to establish a logical connection between the applications program $A_1$ and the terminal T. The communication subsystem 3 may comprise further host computers not shown in the drawing. The logical connection L between the applications program $A_1$ and the terminal T which is established via the communication subsystem 3 is also called a session.

A user of this prior art computer system is confronted with a problem of not being able to effectuate interrupt driven events at the user's command. For example, while a user is using the computer system for creating a report using an editor, the user may need to interrupt the word processing session and switch instantly to another program, such as to look up a phone number that resides in an application program that is different from the one the user is using as an editor.

Furthermore, in some cases it is necessary to input a large number of data via the terminal T on request of the applications program $A_1$, such as addresses of customers. If these data are present as a file stored on a storage medium of the computer system, it is desirable that the data be input to the applications program $A_1$ automatically without interaction of the user. However, in general, this is not possible without changing the applications program $A_1$ which expects the user to input the data via the terminal T on its request. In order to perform the task automatically, the applications program $A_1$ would have to be changed so that data can be inputted automatically from the file stored in the computer system without interaction of the user. In order to automate the task the applications program $A_1$ would have to be at least partially rewritten which normally involves a major effort in time and resources. Consequently, in some cases, the user has to perform the tedious task of inputting the data via the terminal T by hand. This is also disadvantageous since processing time of the computer system and the resources of the communication subsystem are wasted as the inputting of the data by hand requires a relatively long period of time as compared with the automatic data input from the file.

OBJECTS OF THE INVENTION

It is therefore an object of the present invention to provide and improved computer system and an improved method for performing multiple tasks in a computer system.

The object of the present invention is solved by the features laid down in the independent claims. Preferred embodiments of the invention are given in the dependent claims.

SUMMARY OF THE INVENTION

According to the invention the data stream between the application program and the terminal is intercepted and routed to a virtual terminal. This is controlled by a virtual terminal manager.

The concept of virtual terminals is known as such, for example from U.S. Pat. No. 5,109,510, EP-A-0 114 357 and Lantz et al, "Virtual Terminal Management in a Multiple Process Environment", 1979, Proceedings of the 7th Symposium on Operating System Principles, pp. 86–97. However, the prior art is silent as to the application of a virtual terminal concept in a computer system comprising a number of host computers being interconnected with one another and with terminals by an SNA, TCP/IP or similar type of communication subsystem.

According to the present invention the virtual terminal manager creates a true in-storage image of the display screen by analyzing the received data stream according to the actual data stream architecture, such as an SNA 3270 data stream. The in-storage image contains all information about content, layout, color and highlighting etc. of the real display screen.

The virtual terminal manager also performs all functions defined by the data communication protocol of the communication subsystem. Thus the virtual terminal simulates the appearance of a real terminal to an application program. It is completely transparent to the application program whether it works with a virtual terminal or a real terminal.

The virtual terminal manager provides a double interface to the communication subsystem in that it is possible for the, application program and the real terminal to access the virtual terminal at the same time. The consistency of multiple access operations to the virtual terminal advantageously is controlled and monitored by the virtual terminal manager.

Since the virtual terminal manager receives the data stream prior to the real terminal, it can modify the virtual terminal buffer before sending the data to the real terminal. This modification can be:

Conversion to different code standards, e.g. from EBCDIC to ASCII, conversion to different transmission protocols, e.g. from SNA to TCP/IP, conversion into another language code page, improved presentation of old application programs, e.g. by adding color etc., usage of an application programming interface (API) provided by the virtual terminal manager to add data to the virtual terminal buffer, data transfer from other virtual terminals to a specific virtual terminal by usage of an API program, overlay of a message window on the user screen.

In an SNA type environment for example the virtual terminal manager simulates the functionality of one or more LUs as required. Thus a logical connection is establishable via the SNA communication subsystem between the application program and its dedicated virtual terminal. This logical connection in principle is independent from the existence of another logical connection between a real terminal and the dedicated virtual terminal since the dedicated virtual terminal appears to the application program as real terminal. Thereby background operation is made possible.

The invention is advantageous in that it allows multiple sessions to share one real terminal device. When a user switches sessions by using a "hot key" function, the virtual terminal manager allows the access to the data of the new virtual terminal for the real device, still maintaining all other active virtual terminals in the background. Further, updates of virtual terminal buffers which are currently not displayed on a real terminal are made possible as well as the display of partial data of two or more virtual terminal buffers on the real terminal. This allows a user to view more than one host session on his screen.

The virtual terminal manager provides an AP interface for each virtual terminal. This allows the writing of programs which can modify virtual terminal buffers before they are displayed on the real terminal. It also may simulate user input providing for an automated operation. This automated operation may even act on screen content of the dedicated virtual terminal of one applications program to provide an answer to a request of another applications program.

THE FIGURES

Figure 2:
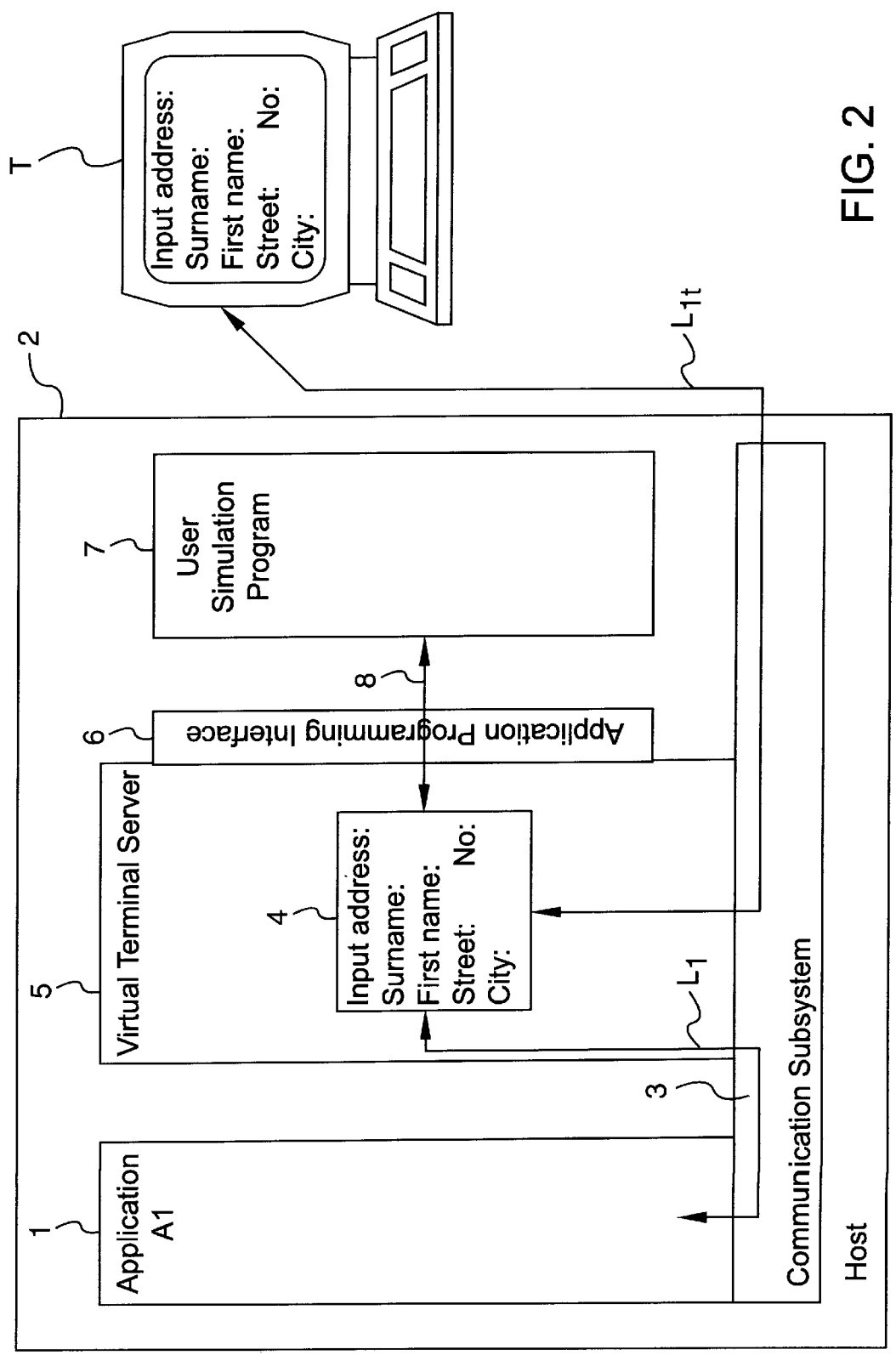
Figure 3:
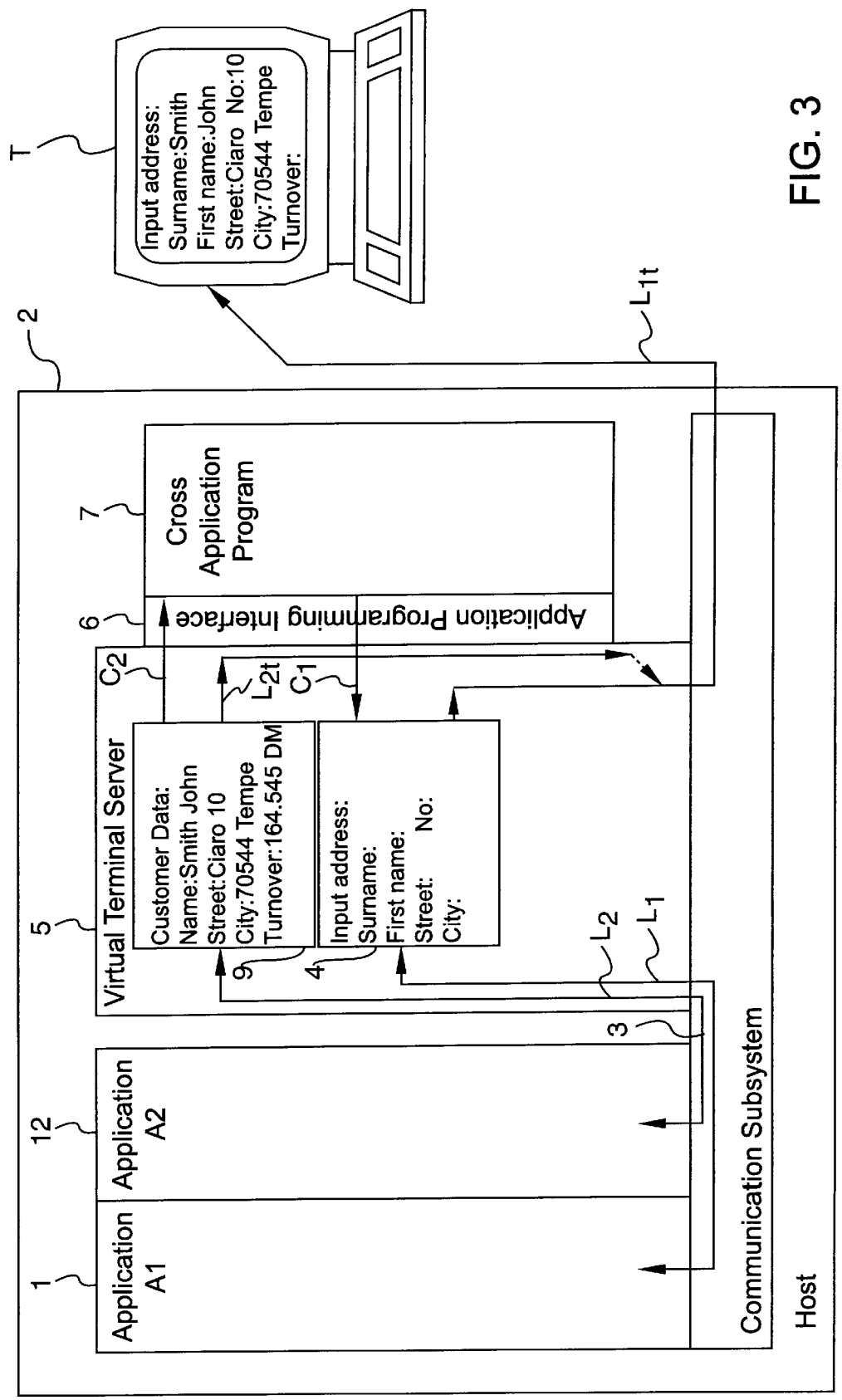
Figure 4:
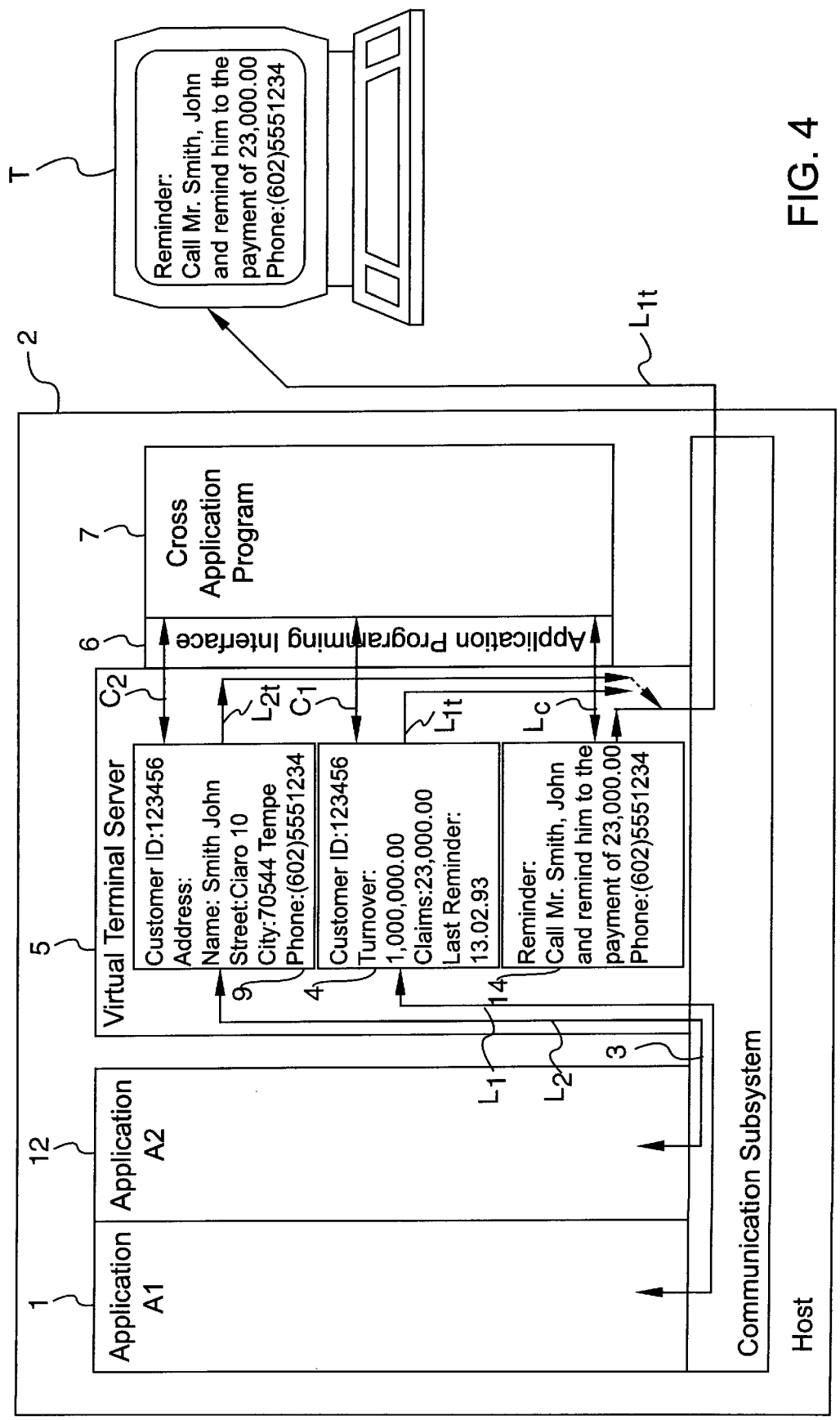
Figure 5:
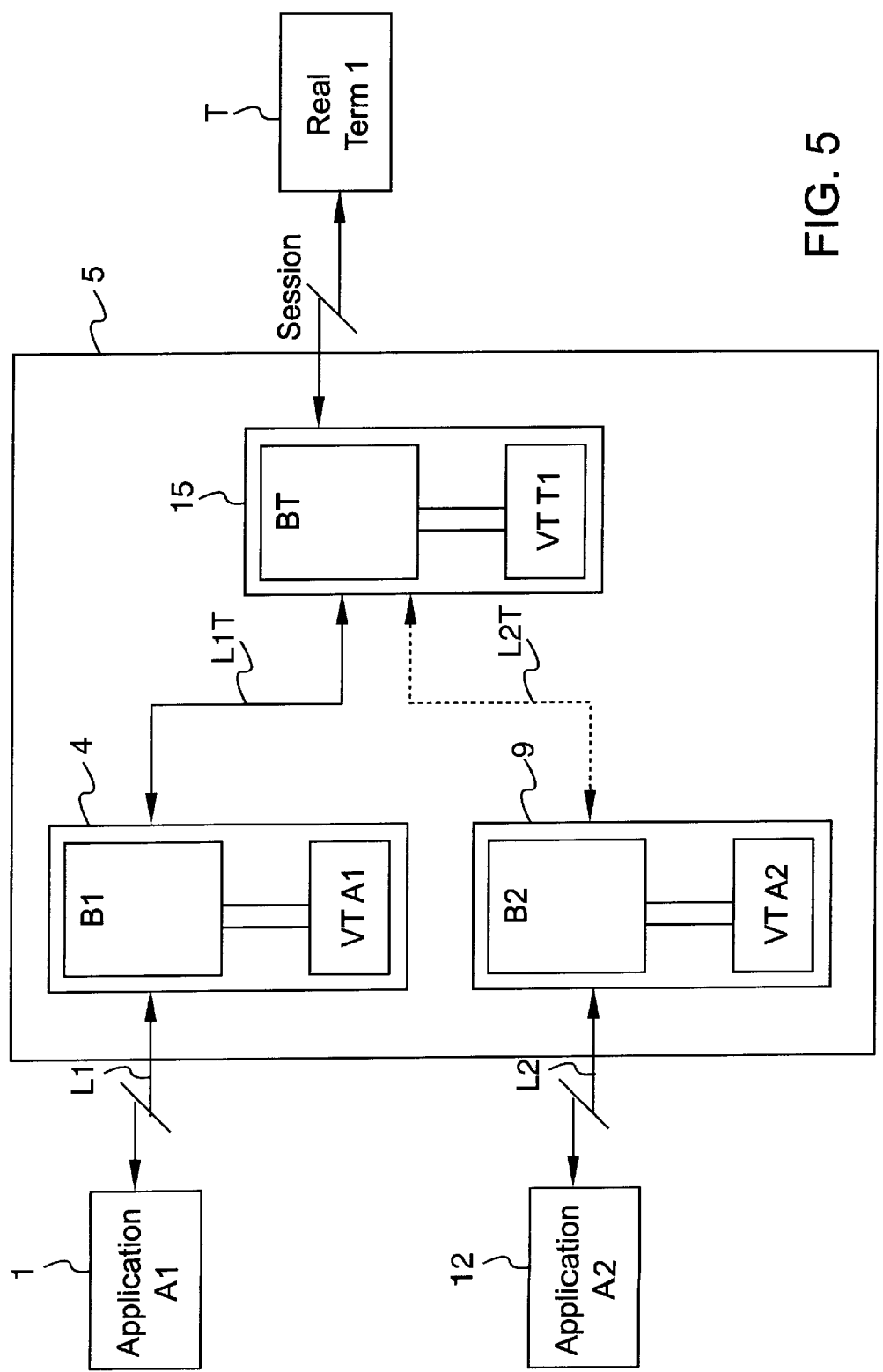
Figure 6:
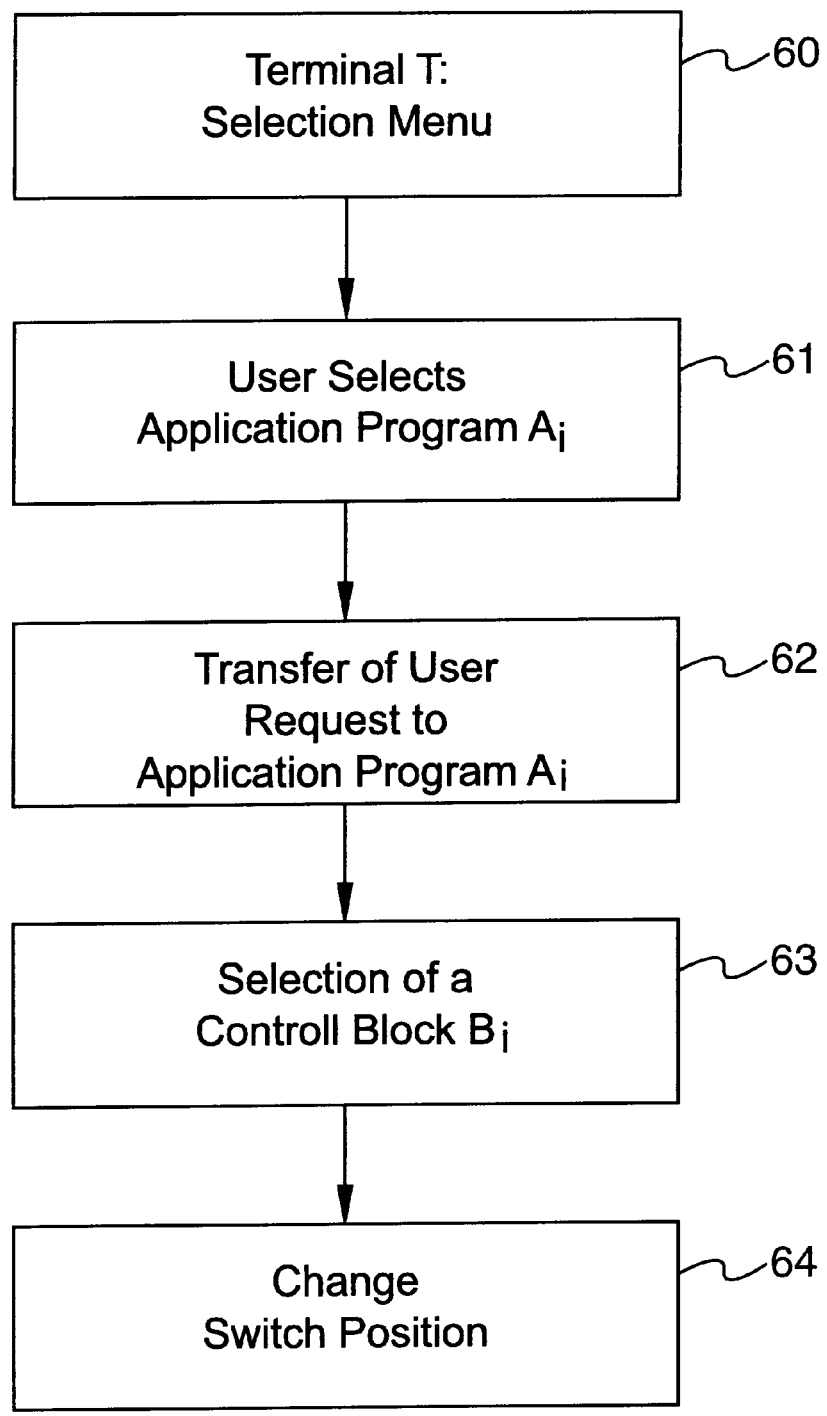
Figure 7:
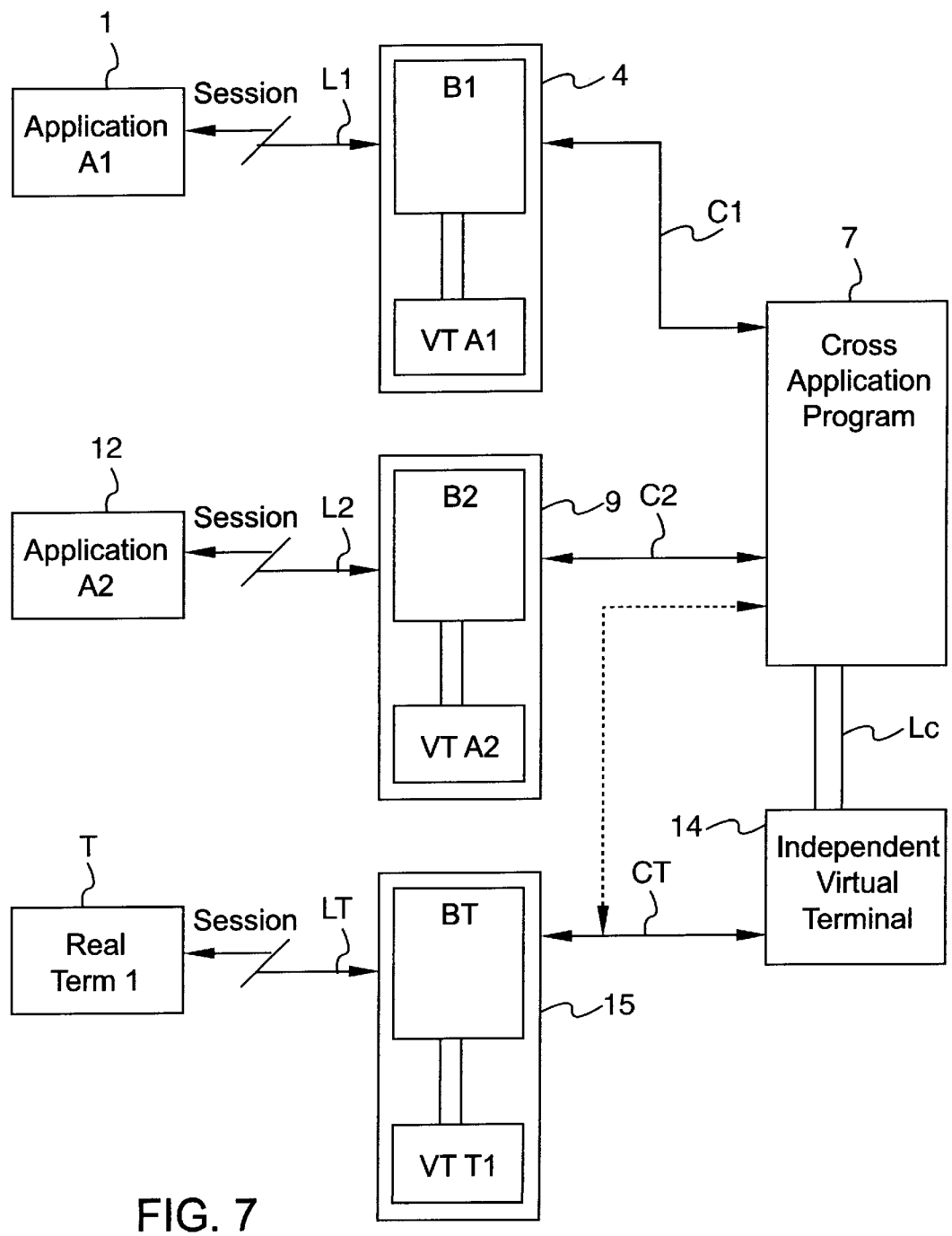

In the following a preferred embodiment of the invention is described in more detail with reference to the drawings in which FIG. 1 is a schematic diagram of a prior art computer system, FIGS. 2, 3, 4 is a schematic diagram of preferred embodiments of the computer system according to the invention, FIG. 5 is a schematic diagram showing the correlation of multiple sessions, FIG. 6 is a flow-chart illustrating the establishment of a session, FIG. 7 is a schematic diagram showing the usage of a cross application program according to the invention.

DETAILED DESCRIPTION OF THE INVENTION

The inventive computer system shown in FIG. 2 differs from the prior art computer system of FIG. 1 in that it additionally comprises a virtual terminal 4, a virtual terminal manager 5, an application programming interface 6 belonging to the virtual terminal manager 5 and a user simulation program 7. A logical connection $L_1$ is established between the applications program $A_1$ and its dedicated virtual terminal 4 via the communication subsystem 3. A logical connection $l_{1T}$ is established between the terminal T and the dedicated virtual terminal 4 of the applications program $A_1$. The data stream coming from the applications program $A_1$ via the logical connection $L_1$ is processed by the virtual terminal function. The data is thereby stored as a screen image which is always a true copy of a real screen buffer, including the extended attribute buffer. In this example, each session is under the control of the IBM virtual telecommunications access method VTAM preferably featuring IBM's advanced communication functions. The virtual telecommunications access method (VTAM) is a set of IBM programs that control communication between terminals and application programs and which cooperates with SNA. The virtual terminal manager makes usage of VTAM for the establishment of the logical connections.

If the logical connection $i_{1T}$ between the terminal T and the virtual terminal 4 is no longer maintained, this is not transparent to the applications program $A_1$, since the logical connection $L_1$ is adapted to be maintained independently from the existence of the logical connection $l_{1T}$. If the applications program $A_1$ requires input from the user, this input operation is carried out automatically by the user simulation program 7. The user simulation program 7 has access to the virtual terminal 4 and in particular to the virtual terminal buffer of the virtual terminal 4 which comprises a true in-storage image of the real screen.

Since the virtual terminal buffer is held preferably in the main memory of the computer system the user simulation program 7 constantly monitors the contents of the virtual terminal buffer. The user simulation program 7 accesses the virtual terminal buffer via the application programming interface 6 of the virtual terminal manager 5. The application programming interface 6 provides all necessary functions to access the virtual terminal buffer. The user written user simulation program 7 gets access to the virtual terminal 4 through the application programming interface 6 provided by the virtual terminal manager 5. The application programming interface provides the following function requests:

Establishment and control of the application and terminal sessions $L_i$, $l_{iT}$ (in this example $L_1$ and $l_{1T}$).

Establishment and control of the virtual terminals.

If a plurality of virtual terminals is established by the virtual terminal manager 5: Control which virtual terminal is displayed on the real terminal T and exchange of data between the user simulation program and different ones of the virtual terminals.

The function requests are used for the programming of the user simulation program 7 which may be written in an interpreter language like REXX or a compilable normal language like PL/1 or C. The application programming interface 6 provides a way to control the access of multiple user simulation programs 7 running concurrently to the virtual terminals of the virtual terminal manager 5 by maintaining a logical connection between a virtual terminal—for example virtual terminal 4 and logical connection $C_1$—and the user simulation program 7 on demand of the user simulation program 7. This is according to an algorithm depending on the requirements of the specific application and is implemented in the user simulation program 7.

To keep the screen image in a virtual terminal consistent with the requirements of the application, the user simulation program 7 is not allowed to change the screen layout when acting as an operator. The user simulation program 7 can only alter the contents of the virtual terminal buffer when a user would be allowed to enter data on the real terminal. The virtual terminal manager assures the consistency by rejecting invalid access requests to the virtual terminal buffer via the application programming interface 6.

The computer system of FIG. 3 additionally comprises a further applications program $A_2$ which is stored in storage space 12 in the host 2, a dedicated virtual terminal 9 of the applications program $A_2$ and a switch 11 which is realized by the software of the virtual terminal manager 5 and the application programming interface 6. Logical connection $C_2$ is established between virtual terminal 9 and user simulation program 7 which in this example is a cross application program 7. The cross application program 7 serves to integrate two or more applications programs. This is explained in more detail in the following:

A logical connection $L_2$ is established between the applications program $A_2$ and the dedicated virtual terminal 9 via the communication subsystem 3. The logical connection $l_{1T}$ in this case is established via the communication subsystem 3 and the switch 11. If the position of switch 11 is changed, another logical connection $l_{2T}$ is established between the virtual terminal 9 and the terminal T. The position of the switch 11 is changed on request of the user of the terminal T by issuing a corresponding command via the logical connection $l_{1T}$ to the virtual terminal manager.

The position of switch 11 can also be changed on request of the user simulation program 7 which in this example is a cross application program.

First the case is considered in which the user is working with the applications program $A_1$. Therefore the logical connections $L_1$ and $l_{1T}$ are established. The applications program $A_1$ requests the input of customer data, for example, name, street, city and turnover from the user. In order to find out the turnover of a specific customer the user must work with a second applications program $A_2$ in order to gain access to a data base. Thus the user requests that the position of switch 11 be changed in order to establish the logical connection $l_2$. This is done by issuing a corresponding command from the terminal T to the virtual terminal manager 5, preferably by making use of a "hot key".

Once the logical connection $l_{2T}$ is established the user inputs the name and address of a specific customer in order to find out the turnover of that customer by means of applications program $A_2$. In response to a user request the switch 11 is shifted back into its starting position so that again the logical connection $l_{1T}$ is established. The user may now input all of the required customer data—including the turnover—into applications program $A_1$.

If an SNA 3270 data stream is used, the data streams in the communication subsystem 3 consist of user-provided data and commands that logical units transmit over an LU-session. Logical units also transmit control information that governs the way the data is handled and formatted. The SNA 3270 data stream is the only data stream that LU types 2 and 3 use. It is an optional data stream for LU types 6.1 and 6.2. The data stream supports file-to-file transfer, display applications, and printer applications.

Generally, an application program communicates with a display operator using one of two methods:

In the first method, the application program leaves the display surface unformatted, and the operator uses it in a free-form manner. In the second method, the application program completely or partially formats the display surface (i.e. organizes or arranges it into fields) and the operator enters data into the fields. The second method is used in the example shown in FIG. 3 since the display operator—especially the user of the terminal T—is only allowed to input data at specified positions in the virtual terminal buffers of the application programs $A_1$, $A_2$.

The SNA 3270 data stream allows the application programmer to divide the display surface into one active area, and, optionally, one or more reference areas. Each area is called a partition. The partition that is "active" contains a cursor and is the only partition in which the operator can enter data or requests.

The second case considered here is that of user simulation program 7 which in this example is a cross application program. If the cross application program 7 is running, the above described procedure of the first case is carried out automatically. If the applications program $A_1$ requests the customer data and especially the turnover to be inputted, this is recognized by the cross application program 7 via the logical connection $C_1$. As a consequence the cross application program 7 inputs the name and address of a specific customer via logical connection $C_2$ to the virtual terminal 9 of the applications program $A_2$ and observes the virtual terminal buffer of the virtual terminal 9 for the result of the query in the data base of the applications program $A_2$ which yields the required turnover of the customer. This number is read from the virtual terminal buffer of applications program $A_2$ and transferred to the cross application program 7 via the logical connection $C_2$. The cross application program 7 inputs the turnover automatically via logical connection $C_1$ to virtual terminal 4. On the next request of the applications program $A_1$ the same sequence of operations is carried out again automatically. This is done without interaction of the user. The user may observe any one of the application programs if a logical connection $l_{1T}$ or $l_{2T}$ to one of the virtual terminal buffers is established via switch 11.

The computer system of FIG. 4 additionally comprises an independent virtual terminal 14. The independent terminal 14 is dedicated to the cross application program. The independent virtual terminal 14 is observed by the user of terminal T since a logical connection $C_T$ is established via switch 11 and communication subsystem 3 between the independent virtual terminal 14 and terminal T.

If for example the applications program $A_1$ requires the customer identification number (ID) in order to access customer data, such as turnover, outstanding claims of unpaid bills and the date of the last reminder, the applications program $A_1$ requests a customer ID to be inputted. This is recognized by the cross application program 7 which is connected with the virtual terminal 4 of applications program $A_1$, since the cross application program 7 observes the virtual terminal buffer of the virtual terminal 4. If the applications program $A_1$ requires the input of a customer identification number which is not known to the cross application program, the cross application program accesses the applications program $A_2$ by the logical connection $C_2$. Name and address of a specific customer is input into the virtual terminal buffer of the virtual terminal 9, the data base of applications program $A_2$ is queried and the result is returned to the virtual terminal buffer of the virtual terminal 9. Then the cross application program 7 inputs the required customer ID which is found out by means of the applications program $A_2$ into the virtual terminal 4 of the applications program $A_1$. The information provided by applications program $A_1$ is monitored by the cross application program via the logical connection $C_1$. In the example shown in FIG. 4 the cross application program 7 recognizes that there are outstanding claims. This relevant information is output via logical connection $L_c$ to the independent virtual terminal 14. Thus the user of the computer system is only notified as to a specific customer if there are outstanding claims of unpaid bills of that customer.

The independent virtual terminal 14 is provided by the virtual terminal manager 5. The independent virtual terminal 14 is not in session with an application program. This allows the set-up of a screen layout which is determined by the cross application program 7. In this case the cross application program 7 controls the session to the real terminal via logical connection $C_T$. Thereby it is possible to define any screen layout to present a new interface to the user of the terminal T. The screen layout may combine the outputs of two or more application screens as it is shown in the figure.

In summary, a user simulation program 7 therefore may perform one or more of the following tasks:
- simulation of user input to an application program for frequently repeated tasks (cf. the preferred embodiment shown in FIG. 2),
- integration of data obtained from virtual terminal buffers which hold a true in storage screen image of currently invisible application programs; the data is integrated into the screen of the currently displayed application program (cf. the preferred embodiment of FIG. 3),
- provision of a new user interface to one or more application programs by providing a new screen layout in an independent virtual terminal (cf. the preferred embodiment of FIG. 4).

This approach is particularly advantageous in that it provides application program-to-application program communication without any change to the effective programs. The appearance to the end user of one or more application programs can be changed without changing the application programs themselves. The user simulation program 7 or the cross application program 7 can be written by the user without any impact on the communication subsystem 3 of the computer system. Furthermore, the programmer of the user simulation program 7 or the cross application program 7 does not have to have any knowledge about the nature of the data stream. This is because a user simulation program 7 can directly access the screen of an application program by access to the corresponding virtual terminal buffer using the API function requests defined by the application programming interface 6. Furthermore, this approach is advantageous since it allows for running the same user simulation program 7 or cross application program 7 concurrently multiple times, each serving a different user of a different terminal T with different virtual terminals involved.

Furthermore, the present invention is particularly beneficial because the communication subsystem 3 is used more efficiently. Whenever a jump, escape or similar type of operation requires the saving of a current screen content only the newly modified data has to be added to virtual terminal buffer of the application program which is in session with the terminal T. No full screen read operation must be issued if, for example, the switch 11 is activated in order to change sessions. This is because virtual terminal buffers always keep a true in-storage image of the real screen in the main memory of the computer system. A jump operation from one application program to another—i.e. changing the position of switch 11 in FIG. 3—or an escape operation where no session with the real terminal T is maintained, only necessitates that the newly modified data which was modified after the last enter command of the user be added to the virtual terminal buffer of the application program from which the jump or escape operation is carried out. When the screen of that application program has to be restored later on to the real terminal T, the corresponding virtual terminal being assigned to that application program will generate a data stream—such as an SNA 3270 data stream—out of its saved virtual terminal buffer and send it to the real terminal. This step is advantageously carried out by making usage of VTAM. In this case only a pointer to the storage location where the virtual terminal buffer of that application program is stored has to be sent to the real terminal. This also improves the operation of the communication subsystem, since transmission time is saved. Consequently switch 11 can be activated very frequently without blocking the communication subsystem 3.

FIG. 5 shows a more detailed view of the computer system shown in FIG. 3. The user simulation program 7 is not shown in FIG. 5. The computer system shown in FIG. 5 additionally comprises with respect to the computer system of FIG. 3 an additional virtual terminal 15. Each of the virtual terminals 4, 9, 15 comprises a control block B1, B2, BT and a virtual terminal buffer VTA1, VTA2, VTT1, respectively. The switch 11 is interposed between virtual terminals 4, 9 which are dedicated to an application program and the virtual terminal 15 which is dedicated to the real terminal T.

The virtual terminal 15 of the real terminal T is already generated when the computer system is switched on. Preferably the computer system is controlled by the IBM program Netview Access Services or a similar product which manages the establishment of interconnections between the components of the computer system. First, the selection menu of Netview Access Services is shown on the real terminal T or in other words the selection menu is stored in the virtual terminal buffer VTT1. This corresponds to step 60 of the flow-chart shown in FIG. 6. In the terminal control block BT resource identification table (RIDT) is stored. The RIDT comprises a pointer $P_T$ which points to the virtual terminal buffer VTT1.

Then the user of the real terminal T selects an applications program $A_i$ of the application programs present in the computer system from the selection menu shown on virtual terminal 15 (step 61). This request of the user to work with the applications program $A_i$ is transferred to applications program $A_i$ (step 62). This transfer is preferably accomplished by means of the IBM program Netview Access Services. The applications program $A_i$ tests whether it can fulfill the user request.

If this is the case an empty control block is selected and marked with an identifier so that this control block becomes the control block $B_i$ of the applications program $A_i$ (step 63). Then a logical connection $l_{iT}$ is established between the dedicated virtual terminal $VT_i$ of the applications program $A_i$ and the real terminal T by putting switch 11 into the required position (step 64). In the example shown in FIG. 5 the applications program $A_1$ is selected by the user and the switch 11 is put into a position so that the logical connection $l_{1T}$ is established. The function of the switch 11 is realized by storage of a first pointer $P_{1T}$ in the control block $B_1$. The pointer $P_{1T}$ points to the control block BT of the real terminal T. A second pointer $P_{Ti}$ is stored in the control block BT. The second pointer $P_{Ti}$ points to the control block $B_i$ of the applications program $A_i$ which is selected by the user. In the example shown in FIG. 5 the pointer $P_{Ti}$ is thus pointing to the control block $B_1$ of the selected applications program $A_1$.

Each control block $B_i$, BT—which is not an empty control block—comprises a resource identification table RIDT. Data as to the resources allocated by the LU—which is simulated by the virtual terminal manager 5—to the applications program $A_i$ or the real terminal T is stored in the RIDT of the corresponding control block $B_i$ or BT.

Each resource identification table in each of the control blocks $B_i$, BT comprises storage fields to indicate the actual state of the virtual terminal buffer VTAi of the virtual terminal VTi to which the control block $B_i$ belongs. These storage fields comprise data as to the screen size, the number of rows and columns of the screen, the cursor position and other hardware characteristics. These data are inputted into the resource identification tables of the control blocks $B_i$, BT by a "BIND" request of the corresponding applications program $A_i$ or the virtual terminal T, respectively.

The virtual terminal 15 of the real terminal T is optional. If no selection menu is used, virtual terminal buffer VTT1 is obsolete. However the control block BT is still required to store the second pointer $P_{Ti}$. If a new logical connection $l_{iT}$ between a virtual terminal $VT_i$ of one of the application programs i and the real terminal T is established, the contents of virtual terminal buffer VTT1 is no longer displayed on the real terminal T, but the contents of the virtual terminal buffer VTAi—in the example shown in FIG. 5 the contents of VTA2—of the applications program $A_i$ which is newly selected. If the user requests another application program—for example the applications program $A_2$—the position of the switch 11 is changed correspondingly as indicated by the dashed lines in FIG. 5. Thereby the logical connection $l_{2T}$ is established.

The case that the user requires a change from the presently selected applications program $A_1$ to the applications program $A_2$ is considered by way of example. The following sequence is carried out:

Firstly real terminal T shows the screen of the applications program $A_1$ or in other words the virtual terminal 4 of that applications program $A_1$ is displayed on the real terminal T. Then the user presses a "jump" key in order to indicate the request to change from applications program $A_1$ to applications program $A_2$. The pressing of the "jump" key implies that the newly modified data stored in the data buffer of the real terminal T are stored in the virtual terminal buffer VTA1 so that the virtual terminal 4 hods the latest update of the screen contents of the real terminal T before the applications program $A_1$ is left.

Secondly the first pointer $P_{1T}$ is changed to be a null pointer in order to indicate that the logical connection $l_{1T}$ is no longer established. The second pointer $P_{Ti}$ is changed so that it points to the control block $B_2$ of the newly selected applications program $A_2$. The pointers $P_{Ti}$ of the application programs i are stored in an ordered table so that the corresponding pointer $P_{T2}$ which is required for changing the position of switch 11 is obtained from that table. That table is established under the control of the virtual terminal manager 5. If there is more than one real terminal T there is a multiplicity of first pointers $P_{iT}$ since each terminal T requires a different first pointer $P_{iT}$. The first pointers are also stored in an ordered table. This table is accessed by the virtual terminal manager 5 in order to read the required first pointer $P_{iT}$—in this example the pointer $P_{2T}$—which points to the terminal control block BT of the terminal T from which the request to access applications program $A_2$ is issued. The pointer $P_{2T}$ is stored in the control block $B_2$ by the virtual terminal manager 5.

Thirdly—in the example shown in FIG. 5—an SNA 3270 data stream is generated from the data stored in the virtual terminal 9. This data stream is transmitted to the real terminal T which consequently shows the screen of the applications program $A_2$.

FIG. 7 shows a more detailed view of the computer system of FIG. 4. Once the cross application program 7 is started the program establishes logical connections $C_1$, $C_2$, $C_T$ by means of the application programming interface 6 and the virtual terminal manager 5 to the virtual terminals 4, 9, 15 and especially to the control blocks Bi, B2, BT in order to gain access to the corresponding virtual terminal buffers VTA1, VTA2, VTT1. Data from these virtual terminals can be composed by cross application program 7 to a new screen which is stored in the independent virtual terminal 14 of the cross application program 7. The screen stored in independent virtual terminal 14 can be transmitted by issuing an appropriate application programming interface command from the cross application program 7 via the logical connection $C_T$ to the virtual terminal 15 for display on the real terminal T. The issuing of the command is indicated by the dotted line in FIG. 7.

The preferred embodiment of FIGS. 4 and 7 is particularly beneficial for the integration of applications programs. If a plurality of applications programs is given—such as applications programs $A_1$ and $A_2$—these are combined by the cross application program 7 in the following way:

a) One applications program $A_i$ of the plurality of applications programs is selected, i.e. a logical connection $C_i$ to the corresponding virtual terminal $VT_i$ of that applications program $A_i$ is established. Further, the cross application program 7 observes the virtual terminal $VT_i$. This is done by observation of the virtual terminal buffer VTAi of the virtual terminal buffer $VT_i$. The cross application program 7 observes the virtual terminal buffer VTAi by making usage of the function requests provided by the application programming interface.

b) If the applications program $A_i$ the input of information, this is recognized by the cross application program 7 due to its observation of the virtual terminal $VT_i$. In response to this request of information by the applications program $A_i$ the cross application program 7 selects another applications program $A_j$ which can provide for the requested information.

c) Consequently, a logical connection $C_j$ to the corresponding virtual terminal $VT_j$ of that applications program $A_j$ is established.

d) The applications program $A_j$ is requested by the cross application program 7 to provide for the information which is requested by the applications program $A_i$ (cf. step b). This is done by inputting a corresponding query request via the logical connection $C_j$ to the virtual terminal $VT_j$ of the applications program $A_j$.

e) The cross application program 7 observes the virtual terminal $VT_j$ by observation of the virtual terminal buffer VTAj. Once the requested information is present in the virtual terminal $VT_j$, this information is outputted via the logical connection $C_j$ to the cross application program 7. Again the cross application program 7 accesses the virtual terminal—in this case $VT_j$—by the function requests provided by the application programming interface 6. The requested information is inputted via the logical connection $C_i$ into the virtual terminal $VT_i$ of the applications program $A_i$.

f) The cross application program 7 observes the virtual terminal $VT_i$ of the applications program $A_i$ for the response of the applications program $A_i$ to the input of the requested information.

g) Once the response of the applications program $A_i$ to the input of the requested information is present, this response is outputted via the logical connection $C_i$ to the cross application program by means of the application programming interface 6. The response of the applications program $A_i$ is tested whether it fulfills a predefined criterium. In the example of FIG. 4 the predefined criterium is whether there are outstanding claims or not.

h) If the predefined criterium is fulfilled by the response, a logical connection $L_c$ is established between the cross application program 7 and its independent virtual terminal $VT_c$ 14. The response of the application program $A_i$ is inputted into the independent virtual terminal $VT_c$ 14 via the logical connection $L_c$. Additional textural information can be added in order to explain the response to the user (cf. the textural information in the independent virtual terminal 14 shown in FIG. 4).

i) The switch 11 is put into a position so that a logical connection $C_T$ is established between the independent virtual terminal $VT_c$ 14 and the terminal T. The user is thereby notified of the response of the applications program $A_i$ since the independent virtual terminal $VT_c$ 14 is displayed on the terminal T.

Preferably a look-up table is stored in the computer system for the selection in the above step b). This look-up table assigns a requested information to a specific applications program which can provide for the requested information. Therefore each table entry is a pair of a requested information and the corresponding program which can provide for the requested information. In the above described step b) this table is accessed in order to find and select the applications program $A_j$ which can provide for the information requested by the applications program $A_i$.

What is claimed is:

1. Computer system for performing multiple tasks, said computer system comprising:
   a real terminal,
   at least one communication subsystem,
   a plurality of host computers,
   a plurality of applications programs, at least two of said plurality of applications programs stored on different ones of said plurality of host computers, and
   a plurality of virtual terminals, one of said plurality of virtual terminals dedicated to a first of said plurality of applications programs and simulating the behavior of said real terminal to said first applications program;
   wherein a first logical connection is establishable via said at least one communication subsystem between said first applications program and aid virtual terminal dedicated to said first applications program, said first logical connection is adapted to be maintained independently from the existence of a second logical connection between said real terminal and said virtual terminal dedicated to said first applications program, and said logical connections are establishable by means of a virtual telecommunications access method.

2. Computer system according to claim 1, wherein:
   each of said plurality of virtual terminals comprises a virtual terminal control block, said virtual terminal control block comprising a virtual terminal control block pointer;
   said real terminal has a dedicated real terminal control block assigned thereto, said real terminal control block comprising a real terminal control block pointer; and
   said second logical connection between said real terminal and said virtual terminal dedicated to said first applications program is establishable by said virtual terminal control block pointer of said virtual terminal dedicated to said first applications program pointing to said real terminal control block, and establishable by said real terminal control block pointer pointing to said virtual terminal control block of said virtual terminal dedicated to said first applications program.

3. Computer system according to claim 2, wherein said virtual terminal control block pointer of said virtual terminal dedicated to said first applications program is a null pointer if said second logical connection between said real terminal and said virtual terminal dedicated to said first applications program is not established.

4. Computer system according to claim 2, wherein another one of said plurality of virtual terminals is dedicated to said real terminal, said virtual terminal dedicated to said real terminal comprising said real terminal control block.

5. Computer system according to claim 2, wherein said computer system further comprises:
   a user simulation program wherein another of said plurality of virtual terminals is dedicated to said user simulation program;
   a third logical connection between said user simulation program and said virtual terminal dedicated to said first applications program is establishable under the control of said user simulation program; and
   a fourth logical connection between said real terminal and said virtual terminal dedicated to said user simulation program is establishable.

6. Computer system according to claim 5, wherein
   said third logical connection between said user simulation program and said virtual terminal dedicated to said first applications program is establishable by said virtual control block pointer of said virtual terminal dedicated to said first applications program pointing to said user simulation program and pointer in a storage location which is assigned to said user simulation program pointing to said virtual terminal control block of said virtual terminal dedicated to said first applications program.

7. Computer system according to claim 5, wherein
   said fourth logical connection between said real terminal and said virtual terminal dedicated to said user simulation program is establishable by said real terminal control block pointer pointing to said virtual terminal control block of said virtual terminal dedicated to said user simulation program and by said virtual control block pointer of said virtual terminal dedicated o said user simulation program pointing to said real terminal control block.

8. Method for performing multiple tasks in a computer system, said computer system comprising a real terminal, a plurality of host computers, a plurality of application programs, a plurality of virtual terminals, and at least one communication subsystem, said method comprising the following steps:
   a) selecting a first applications program out of said plurality of application programs;
   b) dedicating one of said plurality of virtual terminals to said first applications program;
   c) establishing a first logical connection via said at least one communication subsystem between said first applications program and said virtual terminal dedicated to said first applications program;
   d) establishing a second logical connection between said real terminal and said virtual terminal dedicated to said first applications program;
   e) maintaining said first logical connection independently from the existence of said second logical connection; and
   f) establishing said logical connections by means of a virtual telecommunications access method.

9. Method according to claim 8, wherein said first logical connection is established by:
   i) assigning a dedicated control block B to said virtual terminal dedicated to said first applications program;
   ii) assigning a dedicated terminal control block BT to said real terminal;
   iii) storing a first pointer in said control block B; and
   iv) storing a second pointer in said terminal control block BT; and wherein said first pointer points to said terminal control block BT and said second pointer points to said control block B.

10. Method according to claim 8, said computer system further comprising a user simulation program, said method further comprising the following steps:
   g) dedicating another of said plurality of virtual terminals to said user simulation program,
   h) selecting a second applications program out of said plurality of application programs;
   i) dedicating another of said plurality of virtual terminals to said second applications program;
   j) selectively establishing a third logical connection between said user simulation program and said virtual terminal dedicated to said first applications program;
   k) selectively establishing a fourth logical connection between said real terminal and said virtual terminal dedicated to said user simulation program; and
   l) selectively establishing a fifth logical connection between said user simulation program and said virtual terminal dedicated to said second applications program.

11. Method according to claim 10, wherein
said virtual terminal dedicated to said first applications program comprises a virtual terminal buffer which is stored in a main memory of said computer system independently from the existence of a second logical connection, and/or independently from the existence of a third logical connection.

12. A multi-tasking computer system comprising:
a real terminal;
a first applications program capable of sending to said real terminal a first data stream comprising information for generating a first display image on said real terminal;
a virtual terminal manager capable of intercepting said first data stream, generating a first virtual terminal, and routing said first data stream to said first virtual terminal, said first virtual terminal simulating the behavior of said real terminal to said first applications program, and said first virtual terminal comprising a first in-storage copy of said first display image generated from said first data stream;
a first logical connection system for establishing communication between said first applications program and said first virtual terminal via at least one communication subsystem;
a second logical connection system for establishing communications between said real terminal and said first virtual terminal, wherein said virtual terminal manager employs said second logical connection to activate said first virtual terminal, and wherein said first logical connection system is operationally independent of did second logical connection system; and
a user simulation program for simulating user inputs to said first applications program via said first virtual terminal.

13. The multi-tasking computer system of claim 12, wherein
said user simulation program includes a system for transferring data from said user simulation program to said first virtual terminal when said first virtual terminal is not activated and when said first applications program requests user inputted data.

14. The multi-tasking computer system of claim 12, further comprising:
a second applications program capable of sending to said real terminal a second data stream comprising information for generating a second display image on said real terminal;
wherein said virtual terminal manager is further capable of intercepting said second data stream, generating a second virtual terminal, and routing said second data stream to said second virtual terminal, said second virtual terminal simulating the behavior of said real terminal to said second applications program, and said second virtual terminal comprising a second in-storage copy of said second display image generated from said second data stream; and
wherein said user simulation program is a cross application program including a system for transferring application related data between said first virtual terminal and said second virtual terminal.

15. The multi-tasking computer system of claim 14 wherein:
said virtual terminal manager is further capable of generating a third virtual terminal, said third virtual terminal comprising a third in-storage copy of a third display image generated from a third data stream sent from said cross application program to said real terminal, and wherein said third virtual terminal is not in logical communication with said first applications program or said second applications program.

16. A program product comprising:
(A) a virtual terminal manager for generating a plurality of virtual terminals, a first of said plurality of virtual terminals dedicated to a first applications program and simulating the behavior of a real terminal to said first applications program; wherein a first logical connection is establishable between said first applications program and said first virtual terminal, said first logical connection is capable of being maintained independently from the existence of a second logical connection establishable between said real terminal and said first virtual terminal, and said logical connections are establishable by means of a virtual telecommunications access method;
(B) a user simulation program wherein a second of said plurality of virtual terminals is dedicated to said user simulation program; and
(C) signal bearing media bearing said virtual terminal manager and said user simulation program.

17. The program product of claim 16 wherein said signal bearing media comprises transmission media.

18. The program product of claim 16 wherein said signal bearing media comprises recordable media.

19. The program product of claim 16 wherein:
each of said plurality of virtual terminals comprises a virtual terminal control block, said virtual terminal control block comprising a virtual terminal control block pointer;
said second logical connection between said real terminal and said first virtual terminal is establishable by said virtual terminal control block pointer of said first virtual terminal pointing to a real terminal control block, and by a real terminal control block pointer pointing to said virtual terminal control block of said first virtual terminal.

20. The program product of claim 16 wherein:
a third logical connection between said user simulation program and said first virtual terminal is establishable under the control of said user simulation program; and wherein a fourth logical connection between said real terminal and said second virtual terminal is establishable.

21. The program product of claim 20 wherein:

said third logical connection between said user simulation program and said first virtual terminal is establishable by said virtual control block pointer of said first virtual terminal pointing to said user simulation program and by a user simulation program pointer pointing to said virtual terminal control block of said first virtual terminal.

22. The program product of claim 21 wherein:

said fourth logical connection between said real terminal and said second virtual terminal is establishable by said real terminal control block pointer pointing to said virtual terminal control block of said second virtual terminal and by said virtual control block pointer of said second virtual terminal pointing to said real terminal control block.

23. A program product comprising:

(A) a virtual terminal manager for generating a plurality of virtual terminals, a first of said plurality of virtual terminals capable of being dedicated to a first applications program and capable of simulating the behavior of a real terminal to said first applications program; wherein a first logical connection is establishable between said first applications program and said first virtual terminal; wherein a second logical connection is establishable between said real terminal and said first virtual terminal, said first logical connection being capable of operating independently of said second logical connection; and wherein said virtual terminal manager comprises a mechanism capable of activating said first virtual terminal by logically linking said first virtual terminal with said real terminal;

(B) a user simulation program capable of simulating user inputs to said first applications program via said first virtual terminal; and (C) signal bearing media bearing said virtual terminal manager, and said user simulation program.

24. The program product of claim 23 wherein said signal bearing media comprises transmission media.

25. The program product of claim 23 wherein said signal bearing media comprises recordable media.

26. The program product of claim 23 wherein:

said user simulation program is capable of transferring data from said user simulation program to said first virtual terminal when said first virtual terminal is not activated and when said first applications program requests user inputted data.

27. The program product of claim 23 wherein:

a second of said plurality of virtual terminals is capable of being dedicated to a second of said plurality of applications programs, said second virtual terminal capable of simulating the behavior of said real terminal to said second applications program; and wherein said user simulation program is a cross application program including a system capable of transferring application related data between said first virtual terminal and said second virtual terminal.

28. The program product of claim 27 wherein:

a third of said plurality of virtual terminals is dedicated to said cross application program, wherein said third virtual terminal does not require logical communication with said first applications program or said second applications program.

29. The program product of 28 wherein:

said third virtual terminal is capable of providing a screen defined by said cross application program.

* * * * *

UNITED STATES PATENT AND TRADEMARK OFFICE
CERTIFICATE OF CORRECTION

PATENT NO.    : 6,199,160 B1
DATED         : March 6, 2001
INVENTOR(S)   : Echensperger, et al.

It is certified that error appears in the above-identified patent and that said Letters Patent is hereby corrected as shown below:

<u>Abstract,</u>
Line 10, the error noted reads: The logical connections "$1_{3T}$," ...
It should read: The logical connections -- $1_{1T}$, --...

<u>Column 14,</u>
Line 21, the error noted in claim 6 reads: ...simulation program and pointer...
It should read: ...simulation program and -- by a -- pointer...

<u>Column 14,</u>
Line 33, the error noted in claim 7 reads: ...terminal dedicated "o" said ...

It should read: ...terminal dedicated -- to -- said...

<u>Column 15,</u>
Line 50, the error noted in claim 12 reads: ...operationally independent of "did" second...
It should read: ...operationally independent of -- said -- second...

Signed and Sealed this

Sixth Day of November, 2001

Attest:

*Nicholas P. Godici*

*Attesting Officer*

NICHOLAS P. GODICI
*Acting Director of the United States Patent and Trademark Office*